Aug. 10, 1965  H. G. N. TIEMERSMA  3,199,145
SHAFT SEALING SYSTEM
Filed Feb. 8, 1962
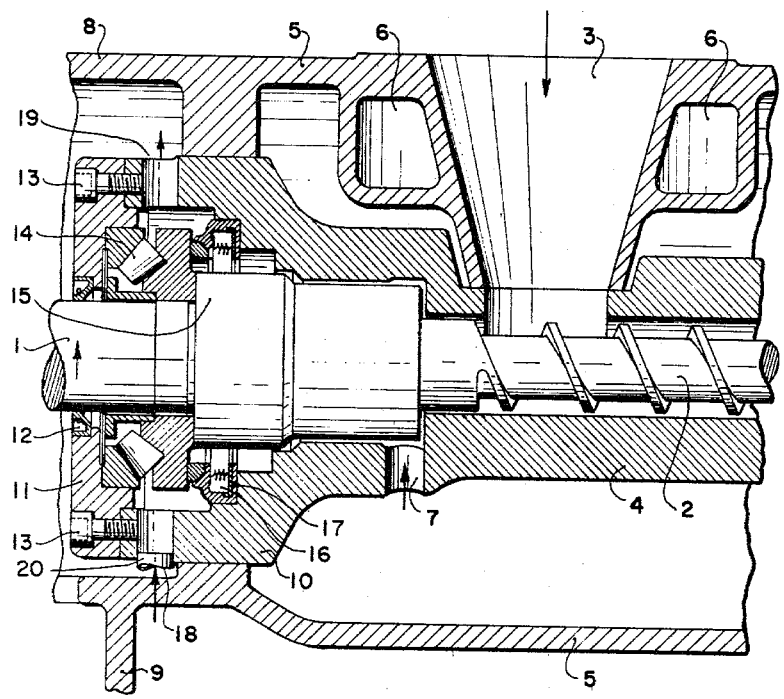
INVENTOR.
HEINE GERKE NICOLAI TIEMERSMA
BY
Francis W. Young
ATTORNEY United States Patent Office 3,199,145
Patented Aug. 10, 1965

3,199,145
SHAFT SEALING SYSTEM
Heine G. N. Tiemersma, Arnhem, Netherlands, assignor to American Enka Corporation, Enka, N.C., a corporation of Delaware
Filed Feb. 8, 1962, Ser. No. 171,869
Claims priority, application Netherlands, Mar. 27, 1961, 262,870
1 Claim. (Cl. 18—12)

This invention relates generally to a system for counteracting the diffusion of air or other gases past a shaft sealing means and more particularly to the use of such a system in the screw extrusion of thermoplastic materials.

Very often in extruding apparatus the shaft of the extruder screw, propeller mixer, or other such part, passes through a partition designed to prevent the exchange of gases between the inner extruding chamber and the atmosphere. For example, in the melt extrusion of thermoplastic material with a screw extruder, the space surrounding the screw is usually filled with an inert gas such as nitrogen and maintained at an elevated pressure so as to prevent the melted material from coming in contact with atmospheric oxygen. This is because the air may cause oxidation of the thermoplastic material resulting in blocking of the apparatus as well as discoloration and deterioration of the quality of the melted material. Even very small quantities of oxygen or other gas can cause the above-described problems.

It ha sbeen found that even with stuffing boxes and other shaft sealing means which are absolutely liquid tight, traces of detrimental gases will be diffused past such sealing means into the extruding chamber. Furthermore, the diffusion takes place against the elevated pressure prevailing on the other side of the seal. Generally, the rate of diffusion of the detrimental gases is always greater than the rate of leakage of the inert gas on the high pressure side of the seal.

A method has been proposed for counteracting such diffusion by considerably increasing the pressure of the inert gas. It has also been suggested to increase the rate at which the inert gas leaks past the shaft seal in combination with increased pressure so that it will be greater than the rate at which the detrimental gas diffuses into the extruding chamber.

Both of these solutions have been found objectionable since high gas pressures require the apparatus to be heavily constructed and the high leakage rate of the inert gas is uneconomical. However, the main objection to such methods is that neither will absolutely prevent diffusion of the outside detrimental gas into the inside chamber.

Accordingly, it is an object of this invention to provide a system for counteracting the diffusion of harmful gases through a shaft seal without incurring the disadvantages found in the prior art.

Another object of this invention is to provide an economical system for counteracting the diffusion of harmful gases through a shaft sealing means into a sealed area containing another gas without increasing the pressure of the gas in the sealed area or rate of escape thereof past the shaft sealing means.

Still another object of this invention is to provide a system for counteracting the diffusion of contaminating gases into the screw chamber of apparatus for extruding thermoplastic material.

These and other objects are accomplished in accordance with this invention wherein harmful gas diffusion past a shaft seal is effectively prevented by flushing a protective gas through one or more chambers positioned outside the inner sealed area and along the shaft. Any trace of the detrimental gas which may have penetrated into one of the chambers is thus diluted by the protective gas to such a high degree that diffusion of this mixture past the shaft seal is not objectionable. The dilution of detrimental gases may be completely controlled by choice of the number of chambers and the amount of gas being flushed through these chambers. It has been found that in most cases a single chamber suffices to maintain the required level of dilution.

The gas passing through the chambers may be of any composition and the pressure under which it is kept during pasage through the chamber is not critical. However, it is preferred if both the gas to be protected against the diffusing gas and the gas which is flushed through the chambers have the same composition. Moreover, if more than one chamber is used it is preferred to decrease the pressure of the flushing gas in the succeeding chambers by stages in the direction of the shaft seal. This invention has been found to be particularly applicable in the melt extrusion of a thermoplastic material using a screw extruder wherein nitrogen is kept under elevated pressure in the screw chamber and chip hopper.

A better understanding of the present invention may be had by referring to the following detailed description taken in conjunction with the accompanying drawing wherein the single figure shows a portion of a screw extruder together with the shaft seal and surroundings in longitudinal section.

Numeral 1 denotes the driving shaft of a screw 2 in a screw extruded for melting granulated thermoplastic polymers. The granules are fed to the barrel 4 of the screw extruder by way of a feed hopper 3, following which the screw 2 moves them to the right, through the barrel 4, to the free end of the screw with the simultaneous application of heat. When the granules reach the end of the barrel, they have become a polymer melt.

The barrel 4 and part of the feed hopper 3 are surrounded by a jacket 5 inside of which are provided several conventional electric heating elements (not shown). Around the top of the feed hopper 3 is a separate jacket 6 through which a cooling medium is passed, thus preventing granules from softening while flowing along the wall of the feed hopper 3. Softening is undersirable and can cause caking, unsatisfactory recharging and even bridging of the granule mass. Alternately, the barrel 4 may be heated by other means.

The jacket 5 is an integral part of the driving box 8 and the frame 9 of the apparatus. The barrel 4 with its expanded rear section 10 is secured within this unit. An inlet channel 7 is provided in the barrel 4, through which nitrogen is fed under a pressure of 100 mm. $H_2O$. Nitrogen is flushed through the rear portion of the barrel, thence to the feed hopper 3, and on through an air-tight granulate container (not shown) located above the hopper.

The barrel 4 is closed at its rear end by a cover 11, through which the drive shaft 1 projects. A spring loaded sealing means 12 (commercially available under the trade name "Simmerring") closes off the passage of drive shaft 1 through cover 11. The cover 11 and barrel 4 are connected by six socket-head screws 13.

Driving shaft 1 is thickened at its driving end and provided with a recess (not shown) for securely embracing the end of extruder screw 2. The thickened end of the shaft 1 and the extruder 2 are coupled in a conventional manner. A conical roller bearing 14 is placed between cover 11 and collar 15 of the thickened portion of the drive shaft 1.

A conventional spring loaded slide-ring 16 is placed between the roller bearing 14 and recessed rim 17 in the expansion 10 of the barrel 4. Said ring insulates the space in the barrel from the space in which the roller bearing 14 is positioned. Nitrogen is flushed through this latter space under a pressure of 50 mm. H₂O. The gas enters this space through the opening 18, and leaves through the opening 19. Various connections and gas lines to and from the openings 7, and 19 are not shown. Gas line 20 is representative of suitable means for supplying gas under pressure to the port 18.

The nitrogen discharge from the granulate container and from the opening 19 is passed through water seals consisting of two bubble flasks (not shown). All static seals of the various communicating parts are made with liquid packing. It has been found that this construction prevents any measurable diffusion of oxygen from the driving box into the barrel space when used in conjunction with applicant's novel and unobvious method whereby a protective gas such as nitrogen is flushed through one or more chambers adjacent the shaft seal.

It is to be understood that the foregoing arrangement is simply illustrative of the application of the principles of this invention. Numerous other arrangements may readily be devised by those skilled in the art without departing from the spirit and scope of the invention which is intended to be limited solely by the following claim.

What is claimed is:

An extruder comprising means defining a melting zone for converting solid into molten material, a screw shaft for feeding material through said melting zone to extrude the same, means for sealing at least one end of said screw shaft from harmful gases outside said melting zone, a housing surrounding and enclosing said sealing means, means defining both inlet and outlet ports in said housing adjacent said sealing means, and means for supplying inert gas under pressure, to and through said ports for flushing the area enclosed by said housing and counteracting diffusion of said harmful gases through said sealing means into said melting zone.

References Cited by the Examiner

UNITED STATES PATENTS

| 781,266 | 1/05 | Bryan et al. | |
| 1,876,515 | 9/32 | Emmet | 277—74 X |
| 2,787,022 | 4/57 | Chisholm. | |
| 3,002,229 | 10/61 | Friederich. | |
| 3,040,005 | 6/62 | Bernhardt et al. | |

FOREIGN PATENTS 817,396  7/59  Great Britain.

ROBERT F. WHITE, *Primary Examiner.*

WILLIAM J. STEPHENSON, ALEXANDER H. BRODMERKEL, *Examiners.*